US012213616B2

(12) United States Patent
Dubief et al.

(10) Patent No.: US 12,213,616 B2
(45) Date of Patent: Feb. 4, 2025

(54) BEVERAGE DISPENSER WITH POWDER CONTAINER

(71) Applicant: SOCIETE DES PRODUITS NESTLE S.A., Vevey (CH)

(72) Inventors: Flavien Dubief, Champagne (CH); Kevin Jamolli, Pully (CH); Paul Michel, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 797 days.

(21) Appl. No.: 17/600,193

(22) PCT Filed: Apr. 3, 2020

(86) PCT No.: PCT/EP2020/059536
§ 371 (c)(1),
(2) Date: Sep. 30, 2021

(87) PCT Pub. No.: WO2020/201498
PCT Pub. Date: Oct. 8, 2020

(65) Prior Publication Data
US 2022/0175179 A1    Jun. 9, 2022

(30) Foreign Application Priority Data
Apr. 4, 2019    (EP) .................................... 19167195

(51) Int. Cl.
*A47J 31/40*     (2006.01)
*A47J 31/44*     (2006.01)

(52) U.S. Cl.
CPC ......... *A47J 31/404* (2013.01); *A47J 31/4403* (2013.01)

(58) Field of Classification Search
CPC ........................... A47J 31/404; A47J 31/4403
See application file for complete search history.

(56) References Cited

U.S. PATENT DOCUMENTS

| 856,619 | A | * | 6/1907 | Camp | ................... | B01F 29/322 |
|---|---|---|---|---|---|---|
| | | | | | | 366/214 |
| 2,860,598 | A | * | 11/1958 | Loesche | ..................... | B01J 2/14 |
| | | | | | | 425/222 |

(Continued)

FOREIGN PATENT DOCUMENTS

| CN | 107205575 A | 9/2017 |
|---|---|---|
| CN | 107205577 A | 9/2017 |

(Continued)

OTHER PUBLICATIONS

Japanese Office Action for Appl No. 2021-558938 dated Aug. 6, 2024, 3 pages.

(Continued)

*Primary Examiner* — Sean M Michalski
(74) *Attorney, Agent, or Firm* — K&L Gates LLP (57) ABSTRACT

The invention concerns a beverage preparation machine (100) for preparing a beverage from a beverage ingredient powder, said machine comprising:—at least one container (1, 1a, 1b, 1c, 1d) configured for storing a beverage ingredient powder and comprising a powder outlet (11, 11a, 11b, 11c, 11d) for dispensing at least one dose of said beverage ingredient powder, and—a rotating device (2) to rotate said at least one container (1) around a rotational axis (XX'), wherein said rotational axis is inclined with respect to vertical and said rotational axis is positioned externally to said at least one container.

19 Claims, 7 Drawing Sheets

(56) References Cited

U.S. PATENT DOCUMENTS

| | | | |
|---|---|---|---|
| 2,956,711 A | 10/1960 | Mortara et al. | |
| 5,134,925 A * | 8/1992 | Bunn | A47J 31/60 99/289 R |
| 5,297,596 A * | 3/1994 | Anson | B67C 11/02 141/342 |
| 5,303,639 A * | 4/1994 | Bunn | A47J 31/54 99/289 R |
| 5,611,261 A * | 3/1997 | Pope | A47J 31/60 99/290 |
| 9,161,653 B2 * | 10/2015 | Rey | A47J 31/4403 |
| 9,648,977 B2 * | 5/2017 | Carbone | A47J 31/404 |
| 9,648,982 B2 | 5/2017 | Bikerman et al. | |
| 11,464,354 B2 * | 10/2022 | Di Maria | B01F 23/53 |
| 2012/0088022 A1 * | 4/2012 | Carbone | A47J 31/40 99/275 |
| 2014/0166697 A1 * | 6/2014 | Rey | A47J 31/404 222/143 |
| 2015/0060481 A1 * | 3/2015 | Murray | A47G 19/34 222/1 |
| 2015/0060482 A1 | 3/2015 | Murray et al. | |
| 2015/0088304 A1 * | 3/2015 | Ameye | A23L 33/135 700/233 |
| 2019/0254465 A1 * | 8/2019 | Di Maria | A47J 31/52 |

FOREIGN PATENT DOCUMENTS

| | | |
|---|---|---|
| EP | 2430954 | 3/2012 |
| EP | 2676581 | 12/2013 |
| JP | S62147591 A | 7/1987 |
| JP | 2011521687 A | 7/2011 |
| JP | 2012522697 A | 9/2012 |
| JP | 2018202148 A | 12/2018 |

OTHER PUBLICATIONS

Japanese Office Action for Appl No. 2021-558938 dated Dec. 5, 2023.

Chinese Office Action for Appl No. 202080026828.8 dated Dec. 30, 2023.

* cited by examiner

BEVERAGE DISPENSER WITH POWDER CONTAINER

CROSS REFERENCE TO RELATED APPLICATIONS

The present application is a National Stage of International Application No. PCT/EP2020/059536, filed on Apr. 3, 2020, which claims priority to European Patent Application No. 19167195.7, filed on Apr. 4, 2019, the entire contents of which are being incorporated herein by reference.

FIELD OF THE INVENTION

The present invention relates to beverage dispensers preparing beverages from a flowable beverage ingredient powder stored in a container and from which a dose of powder is dispensed to prepare a beverage.

BACKGROUND OF THE INVENTION

Many beverages are prepared by mixing a beverage ingredient soluble powder with a diluent. Mixing devices are known for speedier preparation of such beverages by mixing the beverage soluble powder with the diluent, such as water. These devices can comprise a mixing chamber in which the soluble component and the diluent are fed or mixing can happen inside a drinking cup.

Whatever the way the powder and the diluent are mixed together, the soluble beverage powder is usually stored in a container placed above the mixing chamber or the cup and a dosing device doses and delivers a dose of beverage soluble powder inside the mixing chamber or a drinking cup. Diluent is simultaneously fed to the mixing chamber or the cup so that dissolution occurs.

One major issue of the storage of soluble beverage powders is their risk of caking and bridging. Caking is the agglomeration of powder in form of blocks and lumps. Bridging crates voids inside the volume of powder stored in the container. These defaults directly affect the dosing consistency of the powder and eventually the dissolution of the powder depending on the nature of the powder. These defaults directly affect the quality of the final beverage prepared therefrom.

Different solutions have been provided to answer this problem of caking and flowability.

First it is known to introduce mechanical agitators inside the storage containers that are automatically moved when the dosing unit is actuated and a dose is dispensed, as illustrated in WO2004000085 or US2004173637. Yet, such mechanical devices impact the cleaning operations of the canister: in time and complexity. In addition, stored powder is agitated by the wheel when a dose of powder is dispensed only, meaning that, in absence of beverage order, powder is not agitated and caking occurs. Moreover, these mechanical devices inside the container induce a smaller storing volume for the powder. Finally, these devices does not systematically agitate powder at the remote positions or in corner places.

Another solution consists in adding a vibrating device close to the container in order to indirectly vibrate the powder. Vibration can be obtained with a tapping arm or with an electro-magnetic vibrator. A disadvantage of these types of vibrating means is that they do not allow the agitation of the whole powder stored in the container: only the part of powder close to the vibrating means is agitated. Whole powder cannot be fully shake.

Both above solutions are often noisy when agitation or vibration are implemented.

Another solution consists in adding anti-caking agents to the beverage powder, but this addition is not well perceived by the consumers, some are even not authorised or recommended any longer according to regulatory laws such as $SiO_2$, and finally these additives may impact the taste of the beverage.

There is a need for improving the flowability of beverage ingredient powders stored in beverage preparation machines.

It would be advantageous to provide a beverage preparation machine wherein powders devoid of anti-caking agents can be used.

SUMMARY OF THE INVENTION

In a first aspect of the invention, there is provided a beverage preparation machine for preparing a beverage from a beverage ingredient powder, said machine comprising:
  at least one container configured for storing a beverage ingredient powder and comprising a powder outlet for dispensing at least one dose of said beverage ingredient powder, and
  a rotating device to rotate said at least one container around a rotational axis, wherein said rotational axis is inclined with respect to vertical and said rotational axis is positioned externally to said at least one container.

The machine of the present invention prepares beverages from a powder of beverage ingredient. This powder is preferably a soluble beverage ingredient like instant coffee, instant tea, milk powder, chocolate powder.

The machine prepares the beverage by contacting the beverage ingredient with a diluent, preferably water. The beverage ingredient and the diluent can be contacted by any device like: a jet(s) head, a mixing chamber, a whipper chamber. The mixing operation can happen in a chamber that is part of the machine or in a drinking cup positioned in a receiving area of the machine.

The machine comprises at least one container configured for storing a beverage ingredient powder. This container stores multiple doses of beverage ingredient powder. This container is generally refillable. In a less preferred embodiment, it is disposable.

This container comprises a powder outlet for dispensing at least one dose of said beverage ingredient powder.

Preferably, the machine comprises several containers. When containers are filled with different natures of powders, different natures of beverages (coffee, decaf, tea or milk) can be prepared or multi-component beverages can be prepared (milk and coffee).

The beverage preparation machine comprises a rotating device to rotate the container around a rotational axis, that is inclined with respect to vertical.

Accordingly, the rotational axis is not vertical. The direction of the rotational axis (its row vector) comprises a horizontal component.

The rotational movement of the container induces a movement of the container in the space and, on account of the inclined orientation of the rotational axis, during a 360° rotation, the container is turned upside down before coming back to its original position. As a result, powder hold inside the container slides along the internal walls of the container under the effect of gravity and is agitated. The risk of caking, bridging and agglomeration is avoided without the need to add any additive agent to improve the flowability of the powder.

Depending on the specific container (shape, material, size) and the specific stored powder (facility to agglomerate), rotation can be implemented along an angle that is inferior to 360° or greater than 360°, the effect of powder agitation varying with these parameters.

Preferably, the rotational axis is inclined with respect to vertical according to an angle of at least 15° with respect to vertical, and at most 90°, preferably inclined with respect to vertical according to an angle comprised between 45 and 70°.

Depending on the types of machine used, other requirements can be taken into account to define the angle of inclination of the axis, such as the size of the machine (in particular its height and depth) and the ergonomic properties of the global machine.

In one embodiment, the machine comprises a container support configured to support the at least one container and the rotating device is configured to rotate said support.

When the machine comprises several containers, this support enables the rotation of all the containers together simplifying architecture of the machine by the use of one rotating device only for all the containers.

In one preferred embodiment, the internal wall of the container presents a shape and/or an internal movable element configured to agitate powder during rotation of the container around the rotational axis.

In particular, the internal wall can present at least one corner or can comprise at least one element rising from the internal wall.

The movable element can be a flap attached to the internal wall and free to rotate around a hinge during the rotation of the container, or at least one ball free to move inside the container or eventually remotely attached to the internal wall.

Generally, the machine comprises at least one dosing device to cooperate with the powder outlet of the at least one container.

When the machine comprises several containers, the machine can comprise one single dosing device designed to cooperate with the powder outlet of each container or, preferably, the machine can comprise several dosing devices dedicated and attached to the powder outlet of each container.

The rotational axis of the machine is positioned externally to the at least one container. The effect is that the whole container rotates around the rotational axis and is able to circulate along a circular path that is centred on the axis.

Preferably, the machine comprises several containers and all the containers are configured to rotate around one common rotational axis.

All the containers circulate along the same circular path and successively hold the same positions.

As a result of the use of the same rotational axis for all containers, there is a gain of place, in particular compared to aligned dispensers.

Preferably, the containers are positioned on a common circular path around this common rotational axis. In this preferred embodiment, the containers are positioned in a carousel arrangement.

As a result the movement of one of the containers, for example in order to position the container in a powder dispensing position, induces the movement of all the other containers and the agitation of powders in all the containers, even if these other powders are not dispensed, avoiding the risk of caking and agglomeration.

Another advantage is that doses of different powders can be successively dispensed from different containers inside the same mixing chamber or the same cup to prepare multi-component beverages.

According to this last embodiment, it is preferred that:
each container comprises a dedicated dosing device configured to cooperate with the powder outlet of said container in order to dose and dispense at least one dose of powder from the powder outlet, and
said machine comprises one actuator able to actuate the dosing device of each container, and
for each of the containers, the rotating device is configured to put said container:
in one first dosing position where the dosing device of said container is able to cooperate with said actuator, and
in at least one other position where the dosing device of said container is not able to cooperate with the actuator.

In each container, the dosing device cooperates with the powder outlet of the container. Usually the dosing device is attached to the powder outlet. The dosing device cooperates so that it is able to close the outlet of the container at rest and to dose the powder stored in the container and to dispense the dose downwards when it is actuated.

Generally the dosing device is a volumetric dosing unit comprising a cavity of predefined volume through which a dose of powder is introduced and then dispensed downwards to another part of the machine. The dosing device can be a barrel, a sliding chamber, a rotary pierced disc or any similar device.

Generally the dosing device and the container are attached together and form an assembly that can be received in a receiving area for the container inside the machine. Preferably this receiving area presents a shape that fits with the external shape of the assembly. This receiving area is usually supported by the above mentioned container support of the machine. As a result, the dosing device rotates with its dedicated storage container. Generally, the receiving area is configured for enabling the cooperation of the dosing unit with the actuator which remains fixed inside the machine. Accordingly, the machine requires one actuator only.

The dosing device is designed to be movable by an actuator such as a motor enabling a rotating movement of the dosing device or a translation movement of the dosing device.

In addition, the rotating device of the machine is configured to put each container:
in one first dosing position where the dosing device of said container is able to cooperate with said actuator, and
in at least one other position where the dosing device of said container is not able to cooperate with the actuator.

Accordingly, when a dose of powder is to be dispensed from one determined container, the rotating device rotates the containers until the dosing device of said determined container is positioned in the first position where its dosing device is able to cooperate with the actuator. The movement of rotation to the first dosing position, powder inside this determined container, but also powders inside all the other containers, are agitated. Accordingly, the risk of caking and bridging is avoided.

In this first dosing position, the dosing device is placed close to the actuator so as to be ready for actuation.

Preferably, this first dosing position corresponds to the lowest position where the containers are able to be put inside the machine.

Only one container can be hold in the first position where its dosing device is able to cooperate with the actuator. If for the preparation of the selected beverage, specific powders from different containers need to be dosed and dispensed, the rotating device rotates in order to successively position each container storing said specific powders in the first dosing position.

When a container is not in the first dosing position, the dosing device of said container is not actuable by the actuator. The container remains closed.

In one embodiment, the machine comprises at least one vapour evacuation duct aside one container.

As a result, when a beverage is prepared below the first dosing position, the rotating device is able to rotate the containers in order to position said duct above the place the beverage is prepared. The steam, vapour, dust, mist or any projection created during beverage preparation and rising above the chamber can be evacuated by means of the vapour evacuation duct. Usually, the remote end of the duct is connected to a fan in order to facilitate evacuation of vapour. Preferably, the fan creates a flow of air from the remote end of the duct to the place the beverage is prepared in order to blow vapour outside the machine.

Preferably, the machine comprises several vapour evacuation ducts, each duct being positioned between two containers placed aside. Consequently, the rotating device is able to slightly rotate the last container from which powder has just been dosed in order to position the next close duct above the place the beverage is prepared.

The side wall of this evacuation duct can be defined by the external lateral walls of the containers or can be designed inside the container support.

Preferably, the at least one container is oriented inside the beverage preparation machine so that, in the first position where the dosing device of said container is able to cooperate with said actuator, the powder outlet is positioned at the lowest point of the container and is oriented downwardly.

In addition, it is preferred that said at least one container is shaped so that, when said container is in the first position, where the dosing device of said container cooperates with said actuator, the internal wall of the container forms a hopper around the powder outlet and tapering downwards to the powder outlet.

It is preferred that this hopper presents a tapering wall inclined by at least 40° with respect to horizontal when the container is in the first dosing position The above features enables a full and rapid loading of the metering cavity of the dosing device due to gravity fall. In addition the hopper facilitates the complete emptying of the container.

Preferably, the internal walls of the container are designed so that, when the container is rotated 360° from the first position, powder is moved and guided to fall in the hopper when the container returns to the first position.

As a result, even if there remains few powder inside the container, this design guarantees that the last doses of powder are guided to and hold inside the hopper when the container is in the first position.

The design of the internal walls takes into account the fact that the container is put upside down during the complete rotation and, as a consequence, that powder slides and hits successively different internal walls. In particular, it is preferred that, when the container is put upside down, the internal wall opposed to the hopper is inclined with respect to horizontal, the lowest position of said latter wall facing the hopper. As result, at the point of the rotation where the container is put upside down, powder laying on this inclined internal wall is guided to slide at a position facing the hopper. Further rotation puts the container in its first position back and induces powder to fall inside the hopper.

Preferably, this internal wall opposed to the hopper inclined with respect to horizontal is parallel to the rotational axis XX' of the machine. As a result, the machine remains compact. With this particular embodiment, optimal effect in terms of anti-caking, powder evacuation and compactness of the machine has been observed when the rotational axis XX' is comprised between 45 and 70° with respect to vertical.

Generally, when the machine comprises several containers, the machine comprises for each container, a dedicated receiving area for storing the container inside the machine.

In one embodiment, one container and its dedicated receiving area comprise cooperating fool-proofing shapes or present the same colour or the same name of powder is written on them in order to guarantee the right position of each containers inside the machine. In this embodiment, the same powder is always positioned at the same position inside the machine and the control unit of the machine is configured to prepare beverages based on this fixed positions of the containers and their dedicated stored powders.

The machine can comprise a container detector to detect the presence of a container inside each receiving area.

Preferably, the machine comprises one container detector and the detector is positioned to detect the presence of a container in each receiving area during one full rotation of the rotating device. Based on the detection of the containers present inside the machine, the control unit of the machine is configured to propose the preparation of beverages with the powders from containers present inside the machine. For example, the control unit is configured to present through a user interface only the selection of beverages that can be prepared from the containers present in the machine.

In one alternative embodiment, each container can comprise an identification means and the machine can comprise at least one identification means reader.

Usually, the identification means provides information about at least the nature of the powder stored inside the container. Other information like dosing information, frequency of agitation of the powder, shelf life of the powder, . . . can be provided with the identification means.

With this embodiment, the receiving areas can receive any container, the identification means reader enabling the control unit of the machine to identify the nature of the powder stored inside and its position inside the machine. The identification means can be mechanical, magnetic, optical like bar code, electronic like an RFID tag.

The machine can comprise one identification means reader per receiving area, or preferably, the machine can comprise one identification means reader only and the reader is positioned to be able to read the identification means of a container present in a receiving area during the rotation by the rotating device. One full rotation enables the identification of each container and the recognition of the position of each container inside the machine.

In one embodiment, the machine comprises one powder level sensor, said sensor being positioned to detect the level of powder in each container.

Preferably the sensor is positioned to detect the level of powder, when the container is at or close to the first dosing position. At this position, powder is collected to the powder outlet and detection of a low level of powder becomes easier. In addition, detection can be implemented when powder is dosed, or just before or just after, that is when the container is immobilised.

Generally, the machine comprises at least one chamber for contacting a dose of diluent with at least one dose of beverage ingredient.

The chamber is usually positioned below the at least one container in order to receive the dose of beverage ingredient powder therefrom by gravity fall.

The chamber is preferably a mixing chamber for preparing a beverage from the beverage ingredient powder and a diluent. Generally the mixing chamber comprises an opened top to receive the beverage ingredient dose, at last one diluent inlet and a beverage outlet at the bottom.

According to one embodiment the mixing chamber comprises at least one diluent inlet configured for introducing the diluent in the form of a jet inside the chamber. The chamber is preferably configured so that a whirlpool of liquid is created in the chamber and the jet of diluent hits said whirlpool. The mixing chamber can be the one described in WO 2008/071613 or WO 2018/091358.

According to another embodiment the mixing chamber comprises a bowl and a whipper. The whipper is actuated by a motor to mix and usually froth the mixture of powder and diluent. Usually the mixing chamber is positioned under the powder outlet of the container so that the powder can be delivered from the container in the chamber through the top of the chamber by gravity fall.

Generally the top of the mixing chamber is opened so that powder can freely flow inside by gravity fall. By opened it is meant that the top of the chamber is not covered e.g. by a lid.

The diluent inlet is connected to a diluent supply. The diluent is generally water Other types of devices currently known for contacting a beverage ingredient and diluent can be used like jet(s) delivering diluent jet in a drinking cup.

According to one embodiment, the machine comprises a cup receiving area configured to enable the positioning of a cup under the powder outlet of the at least one container during dispensing operation.

Generally, the machine comprises a diluent fluid system. The diluent fluid system can comprise a diluent tank, a diluent pump and a diluent heating and/or cooling device to deliver the requested diluent in the chamber.

The diluent fluid system can be connected to the above mentioned chamber or jets.

In a second aspect, there is provided a method of preparation of a beverage using a beverage preparation machine such as described above,
said method comprising the step of dispensing a dose of beverage ingredient powder from said at least one container, and
wherein said method comprises the step of rotating the container at least before said step of dispensing.

With this step of rotating the container before the step of dispensing, powder inside this container has been agitated and desagglomerated before dispensing. Accordingly, any caking or bridging is avoided and consistent dosing is obtained during dispensing.

Preferably, the method of preparation comprises a step of ordering a beverage and the step of rotating is implemented further to said step and before the step of dispensing.

Accordingly, the step of rotating happens just before dispensing and dosing consistency is even improved.

With a machine comprising several containers and one first dosing position, this step of rotation before dispensing avoids that powder is dosed and dispensed from the container hold and immobilised at the first dosing position for a certain time.

Preferably, in the method, the step of rotating is implemented at predetermined regular time intervals.

Consequently, even if no beverage has been ordered for a certain period of time, powder in is regularly agitated and desagglomerated, limiting any beginning of caking or bridging.

The predetermined regular time can depend on the shape of the container and/or on the nature of the powder hold in some containers, some powders requiring more frequent agitations.

During the step of rotating, the container can be rotated along one full rotation (360°) or more full rotations.

Preferably, rotation is implemented clockwise and anti-clockwise alternately or randomly. Rotation in both directions avoids that powder accumulates in one zone of the container.

When the machine comprises several containers following the same circular path, the selection of the sense of rotation can be based on the shortest way to reach the first dosing position after a beverage has been ordered.

With a beverage preparation machine as described above and comprising several containers, all the containers being configured to rotate around one common rotational axis, and the containers being positioned on a circular path around the common rotational axis, the method of preparation of a beverage can comprise the steps of:
selecting a type of beverage,
determining the beverage ingredient powder corresponding to the selected beverage,
actuating the rotating device until the container storing the determined beverage ingredient powder reaches the first position where the powder outlet of said container cooperates with the dosing device,
actuating said dosing device.

Preferably, the method comprises, after the step of actuating the dosing device, the steps of:
actuating the rotating device so that no container is put in the first dosing position, and then
preparing the beverage inside the chamber by at least mixing the dose of powder with diluent.

The step of actuating the rotating device so that no container is put in the first dosing position guarantees that no vapour generated during the beverage preparation contacts the dosing device of any container. Actually, since dosing usually happens above a mixing chamber or a cup in which beverage is prepared, this rotation to displace the container protects the dosing device of said container.

Usually, with the step of determining the beverage ingredient powder corresponding to the selected beverage, the quantity of powder is determined too. Then, at the step of actuating the dosing device, said device is actuated until the determined quantity of powder is dispensed. If the powder is difficult to dose on account of its strong caking property or if an important predetermined quantity of powder is required, a step of actuating the rotating device during a complete 360° rotation can be implemented before the dosing step is finished, then the dosing device is actuated again in order to get the full pre-determined quantity of powder.

In the present application, by "several", it is meant more than one.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures.

DETAILED DESCRIPTION OF EXEMPLARY EMBODIMENTS

Figure 1A:
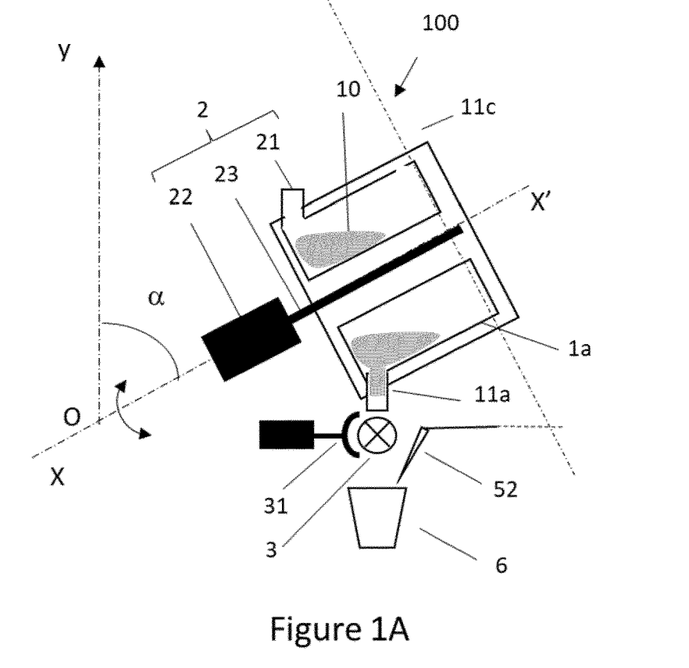
FIGS. 1A and 1B are schematic drawings of a beverage preparation machine according to the present invention.
Figure 1B:
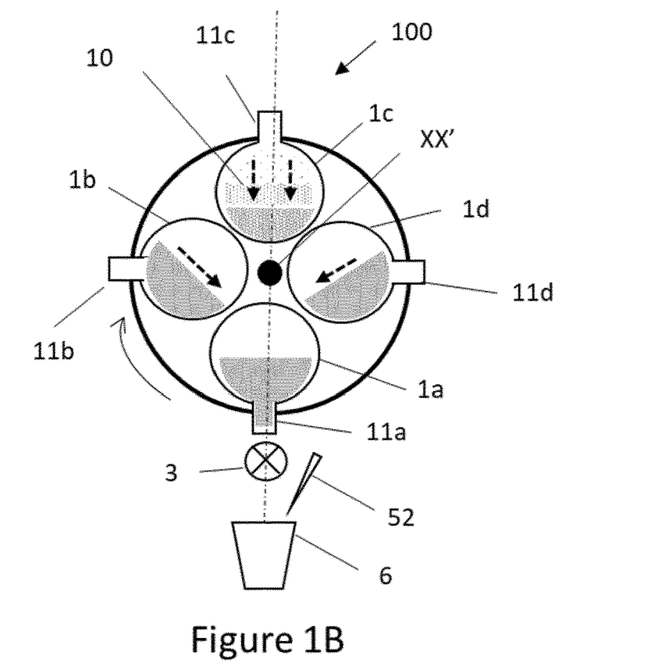

FIGS. 1A, 1B illustrate schematically a beverage preparation machine 100 according to the invention. FIG. 1A is a vertical cross section view of the machine along the plane comprising the axis of rotation XX' and FIG. 1B is a vertical cross section view of the machine along the plane perpendicular the axis of rotation XX'. The machine comprises four containers 1a, 1b, 1c, 1d, each of them storing a beverage ingredient powder 10. The containers can store different types of powders or the same powders. Storing different powders enables the offer of different beverages, for example coffee, milk, tea and chocolate soluble powders, and the combination of at least two powders in the same beverage, for example coffee and milk or tea and milk. The same powder can be stored in several containers if the demand for the corresponding beverage is usually high compared to the other beverages.

The number of containers is not limited to four: less containers or more containers can be used based on the same principle of machine.

The machine can comprise containers of different sizes.

Each container comprises a powder outlet 11a, 11b, 11c, 11d for dispensing the powder 10 stored in the container.

The machine comprises a rotating device 2 configured to rotate the containers 11a, 11b, 11c, 11d around the rotational axis XX'. This axis is inclined with respect to vertical (O, y) along an angle α. This angle is of at least 15° and at most 90° (in that case, the axis is horizontal).

This axis is external to the containers, that is the containers are put aside this axis and, accordingly, the containers rotate aside and around this axis. All the containers are configured to rotate around this common axis XX'.

The full rotation of the containers along this inclined axis induces a movement putting each containers upside down and consequently inducing the movement and agitation of powders stored in the containers. FIGS. 1A and 1B show how container 1c is positioned upside down compared to container 1a.

As illustrated in FIG. 1A, container 1a is positioned at the lowest possible position inside the machine with its powder outlet 11a oriented downwards, that corresponds to the first dosing position. Due to gravity, powder inside this container fills the bottom of this container and is close to this powder outlet. When this container 1a is rotated around the axis XX', it moves upwards and reaches the position hold by the container 1c in FIG. 1A: in this position, the container is positioned upside down with the powder outlet oriented upwards. The powder is free to move inside the container and under the effect of gravity remains at the current bottom part of the container that is the part opposed to the powder outlet. Further to the rotation, the powder has moved and has been agitated. Any effect of bridging or caking of the powder is stopped due to the rotation of the container. As rotation goes on and the container 1a rotates back to its original bottom position, powder agitation continues and the container is put upside down again.

The anti-caking effect is obtained mechanically in a very simple manner since there is no need to introduced complex agitating mechanical devices inside the containers. Eventually, depending on the agglomerating property of the powder, an agitating device can be exceptionally introduced inside one container.

In addition, FIG. 1B illustrates the movement of powders inside the different containers while the containers are rotating and according to their instant angular position. Arrows in dotted line shows the movement of the powders 10:

container 1a is at the first dosing position and, the powder fills the bottom of the container, container 1b has been rotated 90° clockwise from the dispensing position and the powder stored inside slides downwards along the internal wall, container 1c has been rotated upside down from the first position hold by container 1a and the whole powder stored inside falls downwards. At this position, the whole powder has been completely agitated upside down.

container 1d has been rotated 90° clockwise from the position of container 1c and the powder hold inside slides again downwards along the internal wall.

Figure 2:
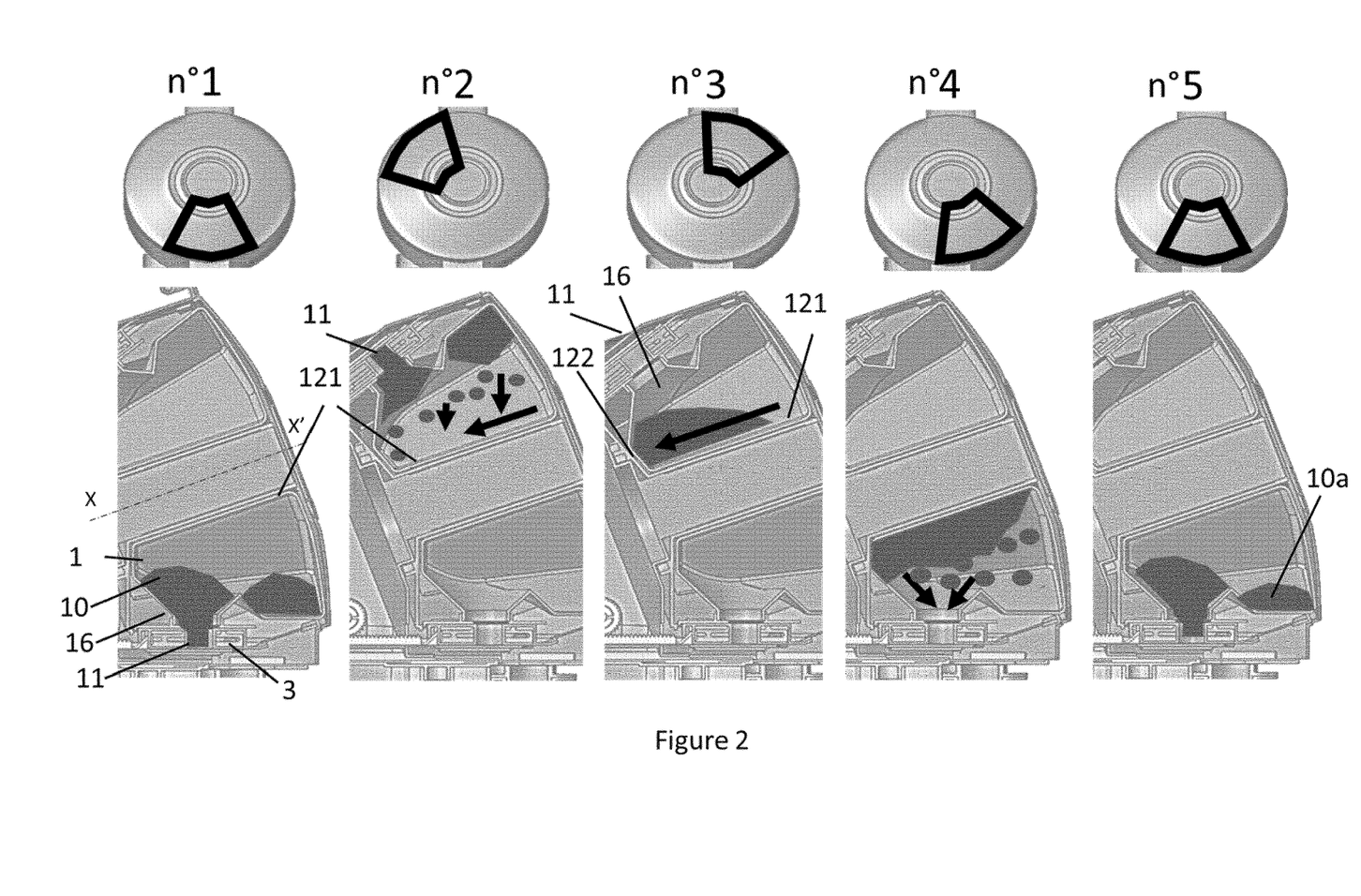
FIG. 2 is a dynamic representation of the movement of the powder inside a container during the rotation of the latter.

The anti-caking effect is much more efficient than the effect obtained with vibrating devices since the rotation impacts the whole powder hold inside the container, whole powder being turned upside down as illustrated in FIG. 2 described below and there is no risk that a part of the powder is not agitated and that local caking effect happens.

This machine enables the use of beverage ingredient powder devoid of any anti-caking agent.

In FIG. 1A, the containers 1a, 1b, 1c, 1d are supported by a container support 21 and the rotating device 2 is configured to rotate this support. As a result, all the containers are rotated simultaneously as soon as one container is rotated. In particular, if one container is selected for beverage preparation and is moved to position its powder outlet downwards, its rotation to this dispensing position induces the rotation of all the other containers and the agitation of all the stored powders even if they are not dispensed.

The rotating device 2 usually comprises a motor 22 with a rotating shaft 23, said shaft cooperating with the containers or the container support 21.

As illustrated in FIGS. 1A, 1B, the machine 100 comprises one dosing device 3 configured to cooperate with the powder outlet 11a, 11b, 11c, 11d of each container in order to dispense at least one dose of powder from each powder outlet. The dose of powder can be dispensed inside a drinking cup 6 or a mixing chamber where it is contacted with a diluent introduced by a tube or nozzle 52.

This dosing device is controlled by an actuator 31, usually a motor with a rotating shaft enabling the rotation or translation of a mechanical element of the dosing device. The dosing device comprises a metering cavity to be filled with powder and movable either by translation or rotation between a filling and metering position and a emptying and dispensing position. This dosing device can comprise a rotating disc such as described in WO 2009/144239 or a dosing drawer such as described in WO 2019/016149.

The rotating device 2 is configured to position each powder outlet 11a, 11b, 11c, 11d in a first position where they are able to cooperate with the dosing device 3 and its actuator 31. This first position corresponds to the lowest position that can be hold by the containers inside the machine so that powder can directly fall by gravity from that position inside a mixing chamber or cup positioned below. This first position is hold by the container 1a in the FIGS. 1A and 1B.

Figure 1C:
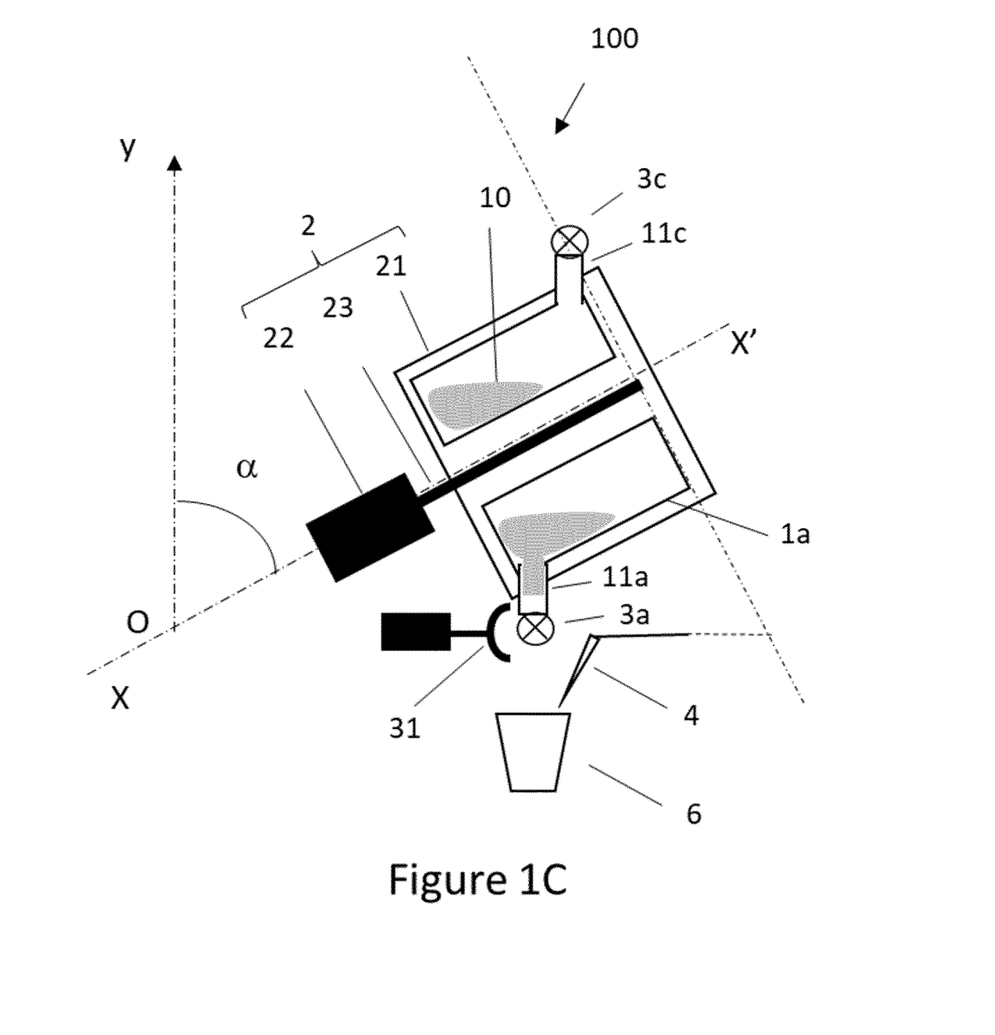
FIGS. 1C, 1D, 1E are alternative embodiments of this machine.
Figure 1D:
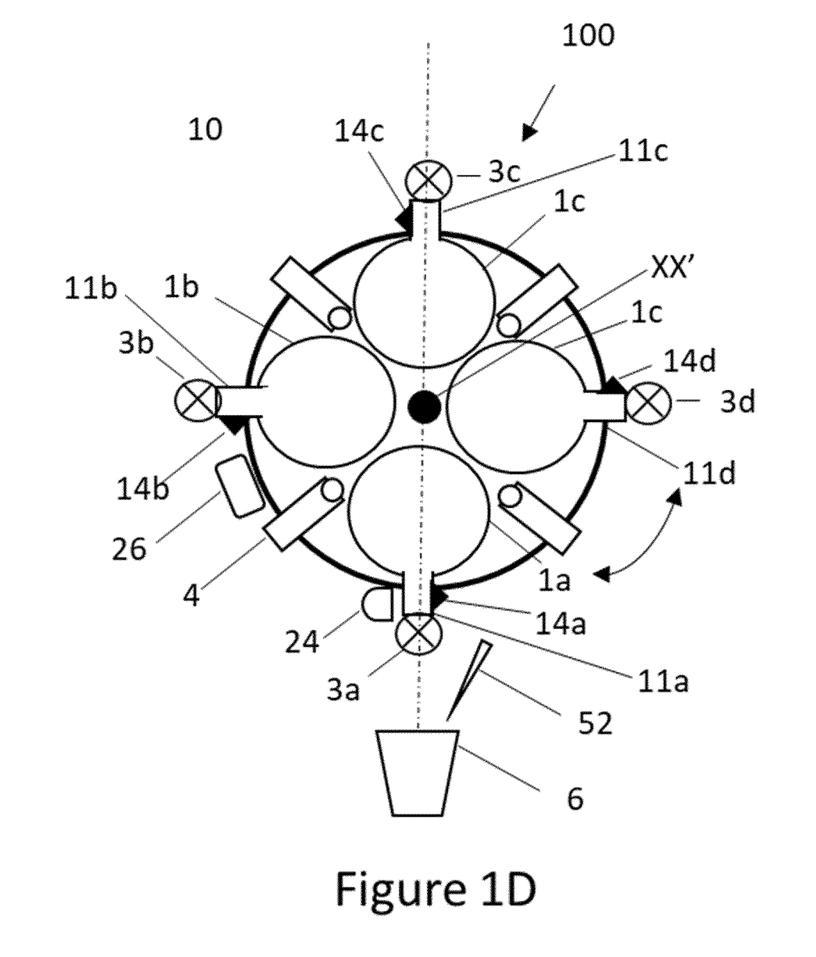
Figure 1E:
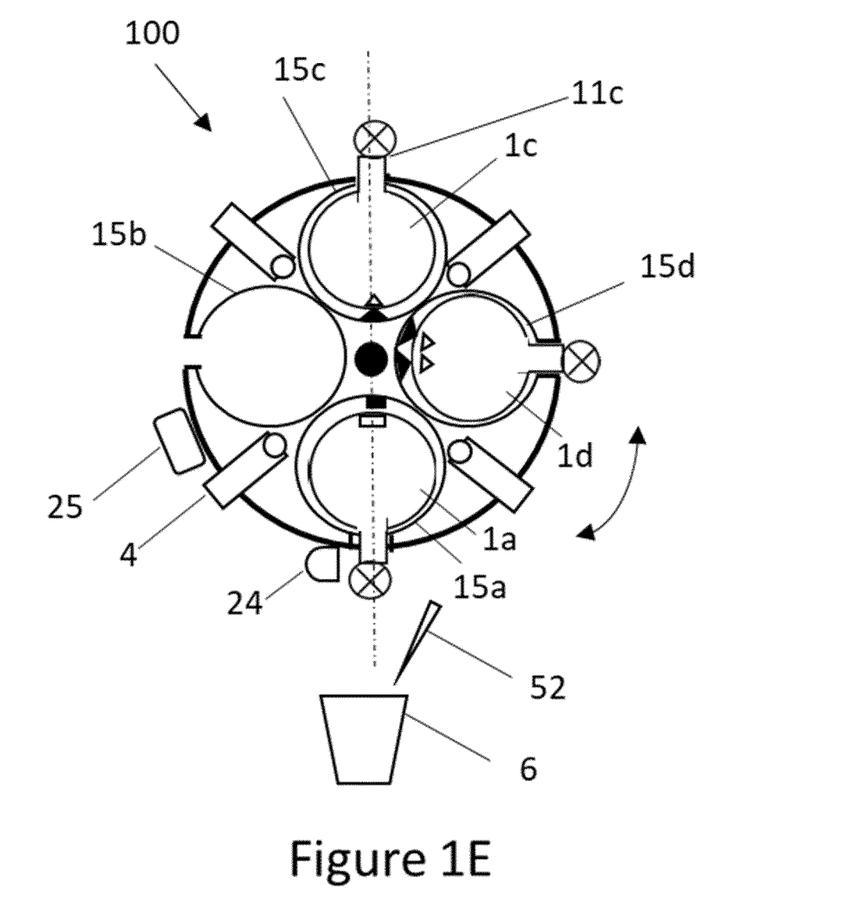

FIGS. 1C to 1E illustrates alternative embodiments of the machine of FIGS. 1A, 1B.

FIG. 1C is a vertical cross section view of a machine 100 along the plane comprising the axis of rotation XX' similar to the machine of FIGS. 1A, 1B except that each container 1a, 1b, 1c, 1d comprises a dedicated dosing device 3a, 3b, 3c, 3d cooperating with the corresponding powder outlet 11a, 11b, 11c, 11d respectively. The machine comprises one actuator 31 only and the rotating device 2 is configured to position each dosing device 3a, 3b, 3c, 3d in a first position where they are able to cooperate with the actuator 31. This first position is hold by the dosing device 3a of the powder outlet 11a of the container 1a in FIG. 1C.

FIG. 1D is a vertical cross section view of the machine 100 of FIG. 1C along the plane perpendicular the axis of rotation XX'.

In this view it is apparent that the machine comprises steam ducts 4 positioned in between two containers placed aside.

Once powder has been dosed in the cup 6 (or alternatively any type of mixing chamber) by actuation of the dosing device 3a by the actuator 31, the rotating device rotates the containers and the steam ducts until one of the steam duct 4 is positioned above the cup 6. Then, diluent can be introduced in the cup 6 (or the chamber) to have the beverage prepared by dissolution of the dose of powder. If steam, dust or mist rises from the cup 6, it is guided and evacuated by the duct 4. Consequently, the rotation of the container 1a and its dosing device 11a away from the source of humidity prevents any issue of caking of powder inside the dosing device 3a which would block it or create hygienic issue. In the schematic view of FIG. 1D, the steam duct 4 is a bent duct with a first part vertically oriented when positioned above the cup 6 and with a second part essentially perpendicular to the first part, e.g. essentially parallel to the axis XX', in order to evacuate humidity out of the machine.

The machine of FIG. 1D illustrates the presence of a powder level sensor 24 in the machine. This sensor enables the detection of the level of powder when a container (3a in the drawing) is rotated in front of this sensor.

The powder level sensor 24 enables the control of the presence of powder inside each container when a container is positioned in front of. If the powder level sensor detects an absence of powder or a level insufficient to prepare a beverage therefrom, preferably the control unit is configured to prevent the selection of this beverage from the user interface.

In the machine of FIG. 1D, each container 1a, 1b, 1c, 1d comprises an identification means 14a, 14b, 14c, 14d respectively. In addition, the machine 100 comprises one reader 26 to read this identification means.

The reader 26 is positioned so that it is able to read the identification means 14a, 14b, 14c, 14d of each container when the containers rotate.

The identification means enables the detection of the presence of a container in each area designed to receive a container since it is possible that no containers are present in some receiving areas. Simultaneously, the identification means provides information about the container and/or the powder stored inside the container such as:
  the nature of the powder,
  the volume of the container,
  the volume of powder metered by the dosing device associated to the container,
  the shelf life of the powder stored in the container,
  the recipe for the preparation of a beverage from the powder stored in the container (dose of powder, ratio of dilution, diluent temperature, . . . ), and or
  the recommended frequency of agitation of the powder that is stored in the container.

Each container can be positioned in any receiving area inside the machine. During a first full rotation of the containers, each identification means can be read by the reader 26 and, for each container, respective container and/or powder information and relative position inside the apparatus is identified and stored by the control unit of the machine for the future preparation of beverages.

Based on said identification and further to a step of selection and ordering of a beverage, the control unit of the machine is configured to identify the current position of the container storing the powder necessary for the preparation and to rotate this container to the first dosing position and to actuate the dosing device at said position.

Based on the information provided by the reader 26, the control unit of the machine can be configured to adapt the user interface of the machine and to present the list of beverages that can be selected and ordered based on the present powders, as well additional general information about each beverage.

In a non-illustrated and less preferred mode, each receiving area for the containers can comprise a reader to read the identification means of the container introduced inside said area.

FIG. 1E illustrates an alternative to the machine of FIG. 1D. The machine 100 comprises receiving areas 15a, 15b, 15c, 15d configured to receive one dedicated container 1a, 1b, 1c, 1d respectively. Each receiving area is dedicated to one container, for example area 15a is configured to receive the container 1a comprising coffee, area 15b is configured to receive the container 1b comprising milk powder, area 15c is configured to receive the container 1c comprising chocolate and area 15d is configured to receive the container 1d comprising decaffeinated coffee. In FIG. 1E, each receiving area and its dedicated container present corresponding shapes that fits one inside the other so that the operator correctly positions each container in the right corresponding receiving area. Alternatively, identical colour can be used for the container and its area, or the name of the container or a beverage can be written on both of them.

In one embodiment, the machine can comprise several identical receiving areas configured to receive the same containers and accordingly the same type of powder. For example, the machine can comprise two containers of coffee. This embodiment answers the case where a type of beverage is more frequently ordered than the others.

With this embodiment, the control unit of the machine is configured to prepare beverages based on the information that each receiving area comprises always the same predetermined nature of beverage and/or the same predetermined type of container.

The machine comprises a container detector 25 that enables the detection of the presence of a container in each receiving area 15a, 15b, 15c, 15d. In the illustrated FIG. 1E, the detector is able to detect the presence of containers 1a, 1c and 1d. Based on that step of detection, the control unit of the machine is configured to propose the preparation of beverages comprising coffee, chocolate and decaf only. Accordingly, the control unit can be configured to erase the selection of beverage comprising milk from the selection of the user interface of the machine. For example, if the user interface comprises a touch screen, beverages comprising milk like cappuccino or latte macchiato can be erased or shaded in the screen.

The control unit of the machine can very rapidly learn about the presence of each container further to one 360° rotation just after the operator has refilled the containers and loaded them inside their respective receiving areas.

In a similar way, the powder level sensor 24 enables the control of the presence of powder inside each container when a container is positioned in front of. If the powder level sensor detects an absence of powder or a level insufficient to prepare a beverage therefrom, the control unit is configured to prevent the selection of this beverage from the user interface.

In all above embodiments, the first position corresponds to the dosing and dispensing position. Preferably, the container is designed and oriented inside the beverage preparation machine so that the powder outlet is positioned at the lowest point of the container and is oriented downwardly when the latter is the first position. As a result, the consistency of powder dosing is improved, even when the level of powder inside the container is low.

FIG. 2 is a dynamic representation of the movement of the powder 10 inside a container 1 in five different angular positions (n °1, n °2, n °3, n °4, n °5) of the rotation of the dispenser: each figure illustrates:
  at the top, a front view of the machine showing the position of the container inside the machine, and
  below each front view, the corresponding vertical cross section of the container inside the machine along a plane comprising the rotational axis XX'. These cross sections schematically illustrate the movement of the powder inside the container depending on the angular position of the container during a complete rotation around the axis XX'.

In position n °1, the container 1 is at the lowest position corresponding to the first dosing and dispensing position, the powder outlet 11 being able to cooperate with the dosing device 3, that is here a translatable drawer comprising a metering cavity. In this position, powder 10 fills the bottom of the container—the hopper 16—and the powder outlet 11 down to the dosing device 3.

In position n °2, the container 1 is rotated about 120° clockwise from position n °1. Due to the rotation of the powder outlet 11, powder is sliding and falling from the powder outlet 11 to the opposed wall 121 facing the bottom outlet, since this opposed wall 121 is oriented below now.

In position n °3, the container 1 is rotated 180° clockwise from the first position, the powder outlet 11 is turned fully upside down and the whole powder has fallen away from the powder outlet 11.

In position n °4, the container is going on rotating clockwise, the powder outlet 11 being positioned back again at a lower position of the container and powder falling back again in direction of the outlet 11 until position n °5 is reached.

During one rotation, the whole powder 10 has been strongly agitated, no part of the powder has been kept immobile. Powder caking is prevented and flowability during dosing is optimised.

During the above described movement, powder 10 hits three times the internal walls of the container (opposed wall 121 at position n °2, lateral wall 122 at position n °3, hopper at position n °4) with the effect that any lump or agglomerated powder is broken.

This effect happens particularly when the internal wall 121 is essentially parallel to the axis of rotation and the axis of rotation is inclined by an angle comprised between 45 and 70° with respect to vertical. With this range of angles for the axis of rotation, it is not necessary to design a large hopper 16 because the movement of the powder always drive powder to same side of the container. The advantage is a compact volume of the containers (specifically the diameter of the container support) and a compact foot print of the machine.

FIG. 2 shows how the design of the internal wall of the container can be optimally shaped to force powder to slide back always inside the powder outlet 11:
  the walls of the container form an internal hopper 16 that brings powder to the beverage outlet when the container is in position n °1 or 5, and
  in positions n °2 and n °3, the wall 121 opposed to the beverage outlet 11 is oriented in order to force powder to slide to a bottom collecting point that faces the hopper 16. As a result, when the container is reversed back to positions n °4 and n °5, powder directly falls inside the powder outlet 11.

In the illustrated figures, the volume of powder stored in the container 11 is larger than the internal volume of the hopper 16, as a result a part 10a of the powder falls outside the hopper 16 at the first dosing position n °1 or n °5. After several dosing operations, when the volume of powder decreases and becomes smaller than the internal volume of the hopper, the above described movement of the powder in the container during a full rotation guarantees that all the powder systematically falls inside the internal volume of the hopper.

Figure 3:
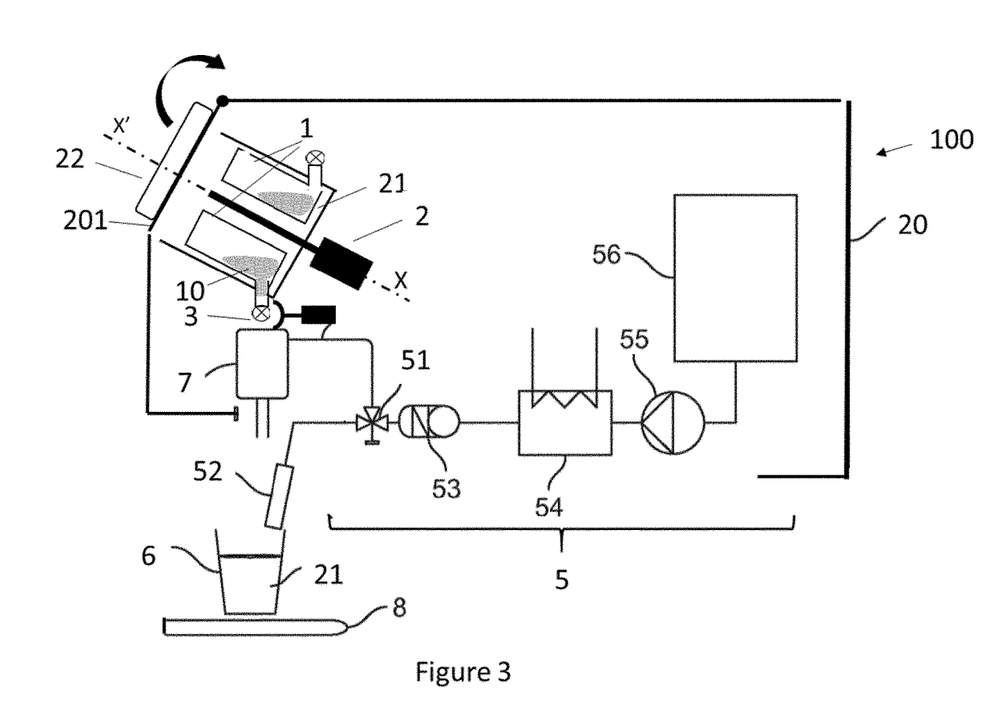
FIG. 3 is a schematic drawing of a particular embodiment of a beverage preparation machine according to the invention.

FIG. 3 is a schematic drawing of a particular embodiment of a beverage preparation machine 100 according to the invention.

The machine comprises several containers 1 for storing powders and a rotating device 2 such as described in FIGS. 1C to 1E or FIG. 2.

The machine prepares a beverage by dissolution of a dose of soluble beverage ingredient dispensed from at least one of the containers inside a mixing chamber 7.

The mixing chamber 7 comprises:
  a water inlet for the introduction of water in order to dissolve the beverage powder, and
  a beverage outlet for dispensing the beverage in a drinking cup 6 placed in a beverage dispensing area 8 of the machine. Generally the beverage outlet is at the bottom of the chamber.

The mixing chamber can be whipperless or not.

The machine can optionally include a water dispensing outlet, that is usually used to dispense water only in the drinking cup 6 or that can present the form of nozzle with the function of frothing the beverage 14 present in the cup 6, as described in WO 2009/144219.

A water supplying system 5 is provided in the machine in order to feed water in the water dispensing outlet 4 or in the mixing chamber 7.

The water supplying system can comprise:
a tank 56,
a water pump 55 for pumping water from the tank. The pump can be any type of pump such as a piston pump, a diaphragm pump.
a water heater 54, and/or eventually a water cooler,
eventually a temperature sensor to measure the temperature of pumped water,
preferably, a non-return valve 53, that prevents introduction of air in the fluid system and the dripping of water when the pump is not actuated,
eventually, a three-way valve 51 diverting water either to the water dispensing outlet 52 or to the mixing chamber 7. This valve is usually a solenoid valve actuated by a motor and is commanded by the control system of the machine.

The machine comprises a housing 101 to hold the different above elements inside. Preferably, the housing comprises a door 103 in front of the containers 1 in order to enable an operator to remove them from the machine for refilling, cleaning or maintenance. In this embodiment, it is preferred that the door is positioned at the upper end of the rotation axis, Usually the machine comprises a user interface 102 to select a beverage from the multiple choices offered by the machine and to order the selected beverage. Preferably this interface is positioned on the openable door 103 as illustrated by the arrow. Preferably, the door is oriented perpendicularly to the rotational axis XX' with the consequence that the front door is inclined with respect to vertical providing an easy ergonomic touch for the person using the user interface. Alternatively, this interface can be positioned on another part of the housing of the machine.

Figure 4:
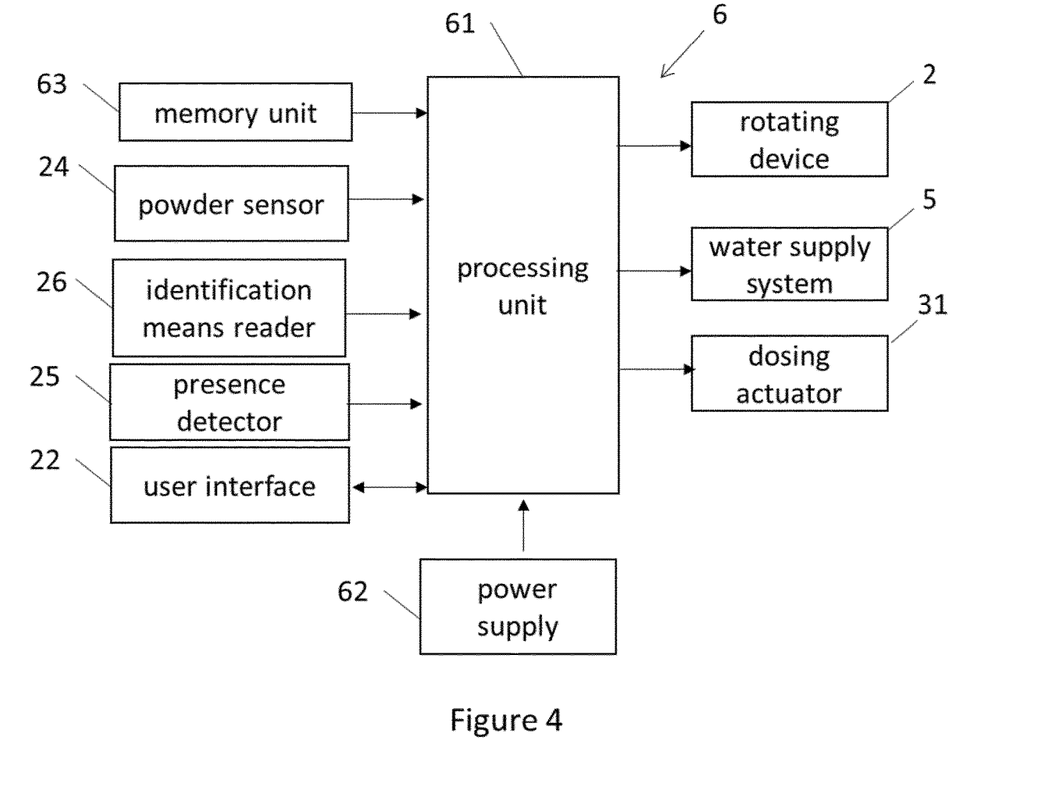
FIG. 4 shows a block diagram of a control system of the beverage preparation machine according to the invention.

With reference to FIG. 1D or 1E and FIG. 4, the control system 200 of the beverage preparation machine will now be considered: the control system 200 is operable to control the components of the beverage preparation machine to prepare a beverage. The control system 200 typically comprises: a user interface 22, a processing unit 201, a power supply 202, a memory 203, the powder sensor 24 and either the identification means reader 26 (machine of FIG. 1D) or the presence detector 25 (machine of FIG. 1E)

The user interface 22 comprises hardware to enable a user to interface with the processing unit 201, by means of user interface signal. More particularly, the user interface receives commands from a user, the user interface signal transfers the said commands to the processing unit 201 as an input. For example, the commands may be information about the selection of the beverage to be prepared. The processing unit 201 may also output information to the user interface 22.

The powder sensor 24, the presence detector 25 and the identification means reader 26 are operable to provide an input signal to the processing unit 201 for monitoring of the beverage preparation method. The input signal can be an analogue or digital signal.

The processing unit 201 comprises memory, input and output system components arranged as an integrated circuit, typically as a microprocessor or a microcontroller. The processing unit 18 may comprises other suitable integrated circuits, such as: an ASIC, a programmable logic device such as a PAL, CPLD, FPGA, PSoC, a system on a chip (SoC), an analogue integrated circuit, such as a controller. For such devices, where appropriate, the aforementioned program code can be considered programed logic or to additionally comprise programmed logic. The processing unit 61 may also comprise one or more of the aforementioned integrated circuits.

The processing unit 201 generally comprises a memory unit 63 for storage of instructions as program code and optionally data. To this end the memory unit typically comprises: a non-volatile memory e.g. EPROM, EEPROM or Flash for the storage of program code and operating parameters as instructions, volatile memory (RAM) for temporary data storage.

The memory unit may comprise separate and/or integrated (e.g. on a die of the semiconductor) memory. For programmable logic devices the instructions can be stored as programmed logic.

The instructions stored on the memory unit 203 can be idealised as comprising a beverage preparation program. The program can be executed by the processing unit 201 in response to the said input such as the commands from the user interface 22 and/or the signal of the powder sensor 24 and/or the signal of either the presence detector 25 or the identification means reader 26. Execution of the program causes the processing unit 1 to control the following components of the machine: the user interface 22, the rotating device 2, the water supply system 5 (in particular the water pump, the heater and/or the cooler, the valve depending on the components of this system) and the dosing actuator 31.

In a step following the loading of the containers, the processing unit 201 is operable to:
provide an output, which is the rotation of the rotating device 2 in order to rotate each container receiving area or container in front of the presence detector 25 or the identification means reader 26,
receive an input from the presence detector 25 relative to the presence or not of a container inside the receiving area or from the identification means reader 26 relative to the nature of the container and its relative angular position inside the machine,
process and store the input according to the program code (or programmed logic) stored on the memory unit 203,
provide and output, which is the presentation through the user interface of the beverages that can be ordered from the loaded containers.

In a non-dispensing state of the machine, the processing unit 201 is operable to provide an output that is actuating the rotating device 2 according to the program code stored on the memory unit 203.

The program code provides the rule for the rotation of containers in order to agitate the powders and to prevent caking and bridging inside the container. The code can set rotation at predetermined regular time intervals, the sense of rotation, the time length for the rotation or the number of full rotations, . . .

The rule can depend on the shape of the container and/or on the nature of the powder stored in some containers. The rules stored in the memory unit 203 can be adjusted or learned based on the input provided during the identification of the containers by the reader 26.

In a step of beverage preparation by a consumer, the processing unit 201 is operable to:
receive an input from the user interface 22, that is the order of a specific beverage,
process the input according to the program code (or programmed logic) stored on the memory unit 203,
provide an output, which is the beverage preparation process. More specifically the output comprises the operation of:
actuating the rotating device 2 to position the container corresponding to the ordered beverage at the fist dosing position, actuating the dosing actuator 31 to dispense the quantity of powder corresponding to the ordered beverage, actuating the rotating device 2 to position the container aside the first position, actuating the diluent supply system 5 to dispense diluent in contact with the powder.

eventually repeating the above operations if the beverage is composed of different components (such as milk and coffee).

A part of the program is usually based on a beverage recipe that can relate to a ratio of beverage powder to diluent, a time sequence for the introduction of diluent and/or the beverage powder.

After the step of actuating the dosing actuator 31, the processing unit 201 can be operable to:

receive an input from the powder sensor 24, process the input according to the program code (or programmed logic) stored on the memory unit 203, in particular applying the following instruction: if the measured level of powder is below a predetermined value, provide an output which is the deletion through the user interface of the presentation of the beverage(s) prepared from this powder.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS beverage preparation machine 100
container 1, 1a, 1b, 1c, 1d
powder outlet 11, 11a
internal wall 12, 121, 122
identification means 14
receiving area 15a, 15b, 15c, 15d
hopper 16
rotating device 2
container support 21
motor 22
shaft 23
level detector 24
container detector 25
identification means reader 26
dosing device 3, 3a, 3c, 3c, 3d
actuator 31
steam duct 4
water supply system 5
three-way valve 51
nozzle 52
non return valve 53
heater 54
pump 55
tank 56
drinking cup 6
beverage 61
mixing chamber 7
cup receiving area 8
housing 9
powder 10
housing 101
user interface 102
door 103
control unit 200
processing unit 201
power supply 202
memory unit 203

The invention claimed is:

1. Beverage preparation machine for preparing a beverage from a beverage ingredient powder, the machine comprising:

at least one container configured for storing a beverage ingredient powder and comprising a powder outlet for dispensing at least one dose of the beverage ingredient powder, and a rotating device to rotate the at least one container around a rotational axis, wherein the rotational axis is inclined with respect to vertical and the rotational axis is positioned externally to the at least one container.

2. Beverage preparation machine according to claim 1, wherein the rotational axis is inclined with respect to vertical according to an angle of at least 15° with respect to vertical, and at most 90°.

3. Beverage preparation machine according to claim 1, wherein the internal wall of the container presents a shape and/or an internal movable element configured to agitate powder during rotation of the container around the rotational axis.

4. Beverage preparation machine according to claim 1, wherein the machine comprises at least one dosing device configured to cooperate with the powder outlet of the at least one container.

5. Beverage preparation machine according to claim 1, wherein the machine comprises several containers and all the containers are configured to rotate around one common rotational axis.

6. Beverage preparation machine according to claim 5, wherein:

each container comprises a dedicated dosing device configured to cooperate with the powder outlet of the container in order to dose and dispense at least one dose of powder from the powder outlet, and the machine comprises one actuator able to actuate the dosing device of each container, and for each of the containers, the rotating device is configured to put the container:

in one first dosing position where the dosing device of the container is able to cooperate with the actuator, and in at least one other position where the dosing device of the container is not able to cooperate with the actuator.

7. Beverage preparation machine according to claim 6, wherein the machine comprises at least one vapour evacuation duct aside one container.

8. Beverage preparation machine according to claim 6, wherein each container is designed and is oriented inside the beverage preparation machine so that, when the container is positioned in the first dosing position, the powder outlet is positioned at the lowest point of the container and is oriented downwardly.

9. Beverage preparation machine according to claim 6, wherein each container is designed so that, when the container is in the first dosing position, the internal wall of the container forms a hopper around the powder outlet and tapering to the powder outlet.

10. Beverage preparation machine according to claim 9, wherein the internal walls of the container are designed so that, when the container is rotated 360° from the first position, powder is moved and guided to fall in the hopper when the container returns to the first position.

11. Beverage preparation machine according to claim 5, wherein the machine comprises, for each container, a dedicated receiving area for storing the container inside the machine.

12. Beverage preparation machine according to claim 11, wherein the machine comprises a container detector to detect the presence of the container inside each receiving area.

13. Beverage preparation machine according to claim 5, wherein each container comprises an identification means and the machine comprises at least one identification means reader to identify each container.

14. Beverage preparation machine according to claim 5, wherein the machine comprises one powder level sensor, the sensor being positioned to detect the level of powder in each container.

15. Beverage preparation machine according to claim 1, wherein the machine comprises a chamber for contacting a dose of diluent with at least one dose of beverage ingredient.

16. Method of preparation of a beverage using a beverage preparation machine for preparing a beverage from a beverage ingredient powder, the machine comprising at least one container configured for storing a beverage ingredient powder and comprising a powder outlet for dispensing at least one dose of the beverage ingredient powder, and a rotating device to rotate the at least one container around a rotational axis, wherein the rotational axis is inclined with respect to vertical and the rotational axis is positioned externally to the at least one container comprising:

the step of dispensing a dose of beverage ingredient powder from the at least one container, and wherein the method comprises the step of rotating the container at least before the step of dispensing.

17. Method according to claim 16, wherein the method comprises a step of ordering a beverage and the step of rotating is implemented further to the ordering step and before the step of dispensing.

18. Method according to claim 16, wherein the method comprises the steps of:

selecting a beverage, determining the beverage ingredient powder corresponding to the selected beverage, actuating the rotating device until the container storing the determined beverage ingredient powder reaches the first position where the powder outlet of the container cooperates with the dosing device, and actuating the dosing device.

19. Method according to claim 18, wherein the method comprises, after the step of actuating the dosing device, the steps of:

actuating the rotating device so that no container is put in the first dosing position, and then preparing the beverage inside the chamber by at least mixing the dose of powder with diluent.

* * * * *